Aug. 23, 1966            J. R. JOHNSON            3,268,074
                         GAUGING APPARATUS
Filed Nov. 29, 1963                              5 Sheets-Sheet 4
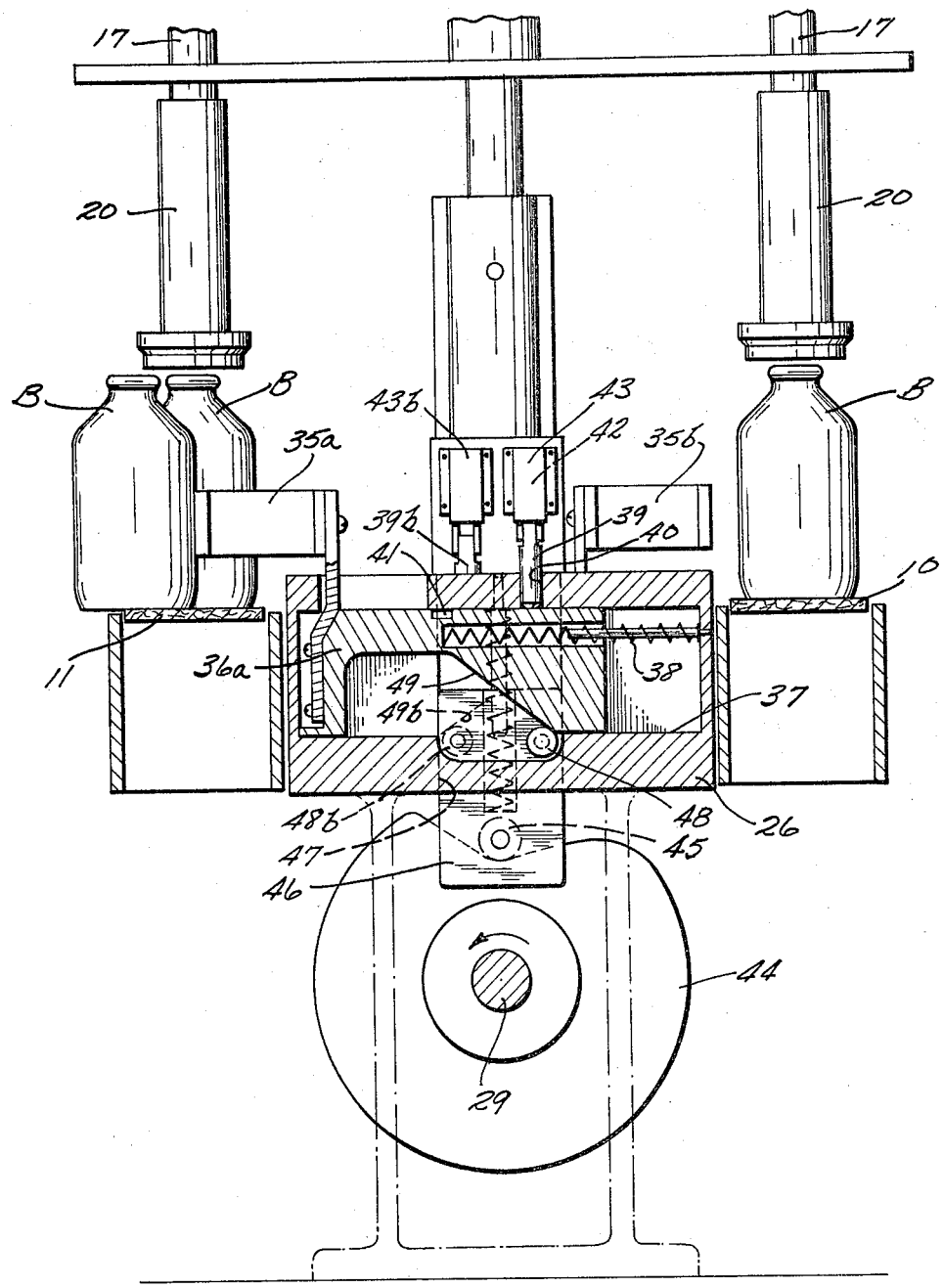
INVENTOR.
JOHN R. JOHNSON
BY J. R. Nelson and
   W. A. Schaich
   ATTORNEYS Aug. 23, 1966  J. R. JOHNSON  3,268,074
GAUGING APPARATUS
Filed Nov. 29, 1963  5 Sheets-Sheet 5
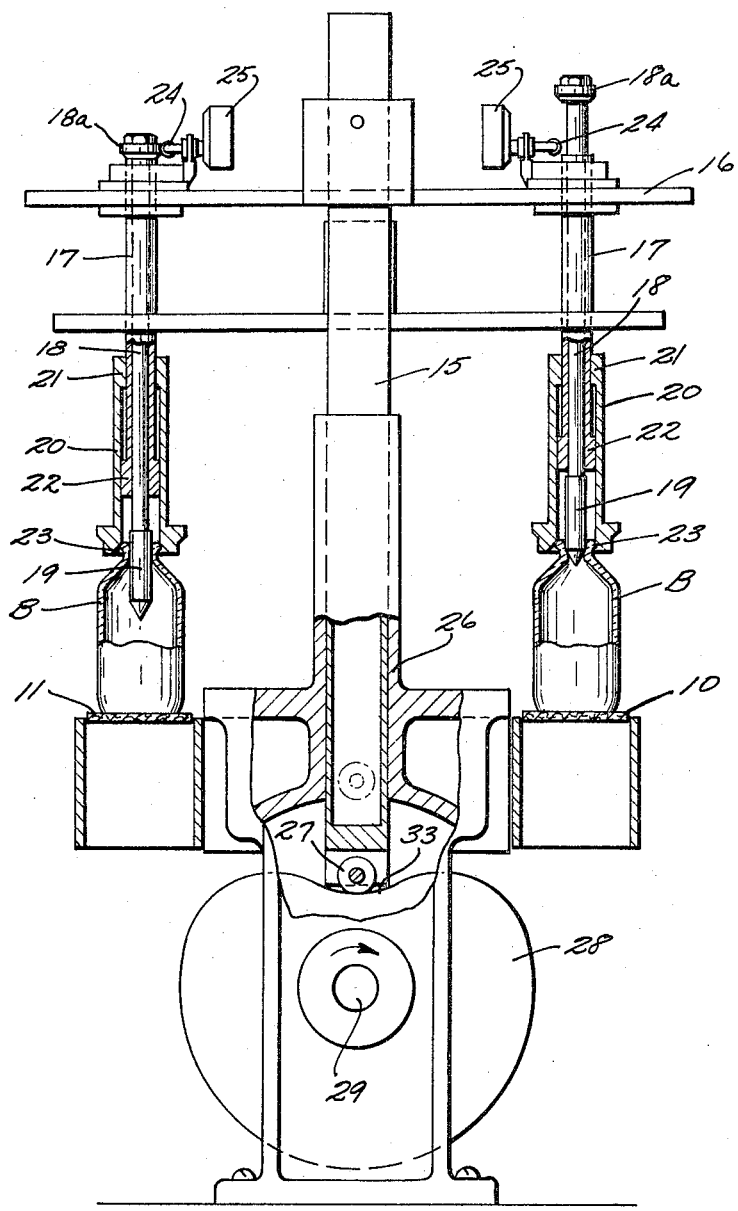
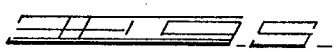
INVENTOR.
JOHN R. JOHNSON
BY
J. R. Nelson and
W. A. Schaich
ATTORNEYS United States Patent Office 3,268,074
Patented August 23, 1966

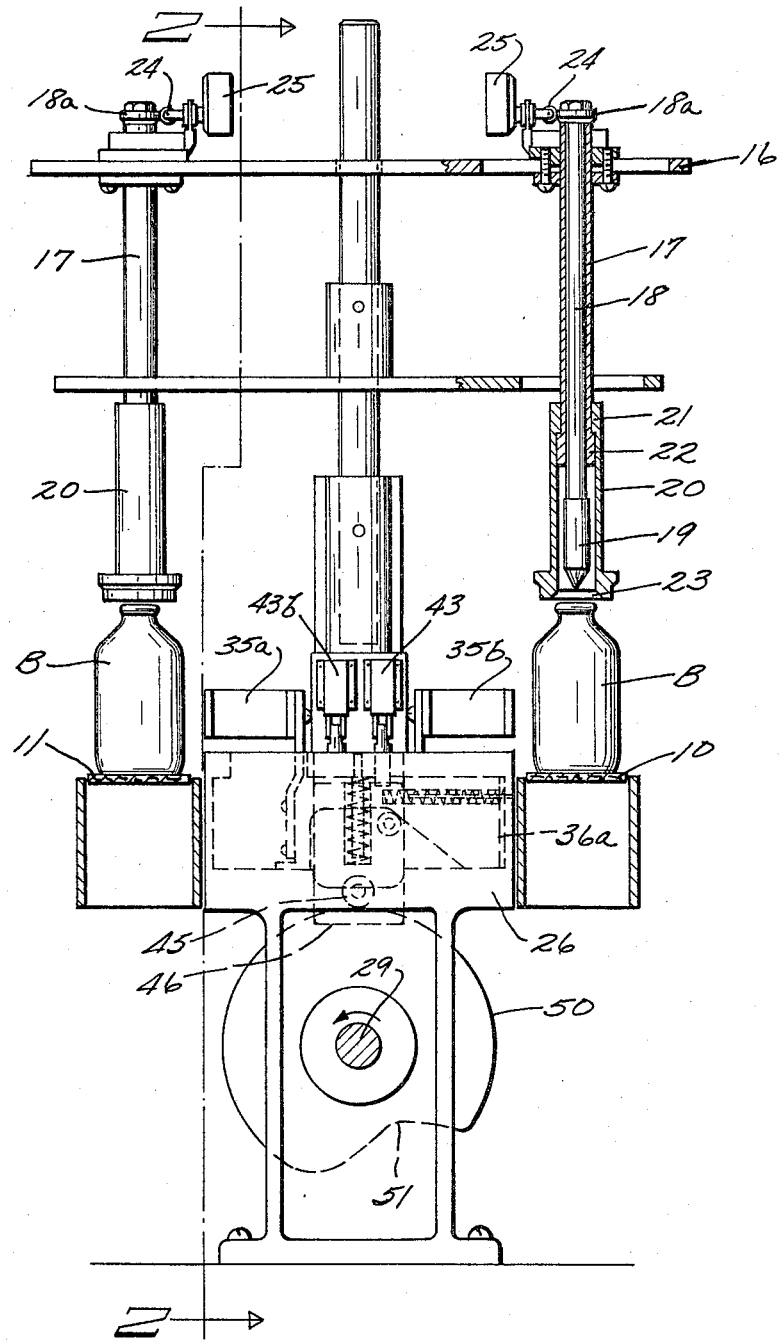

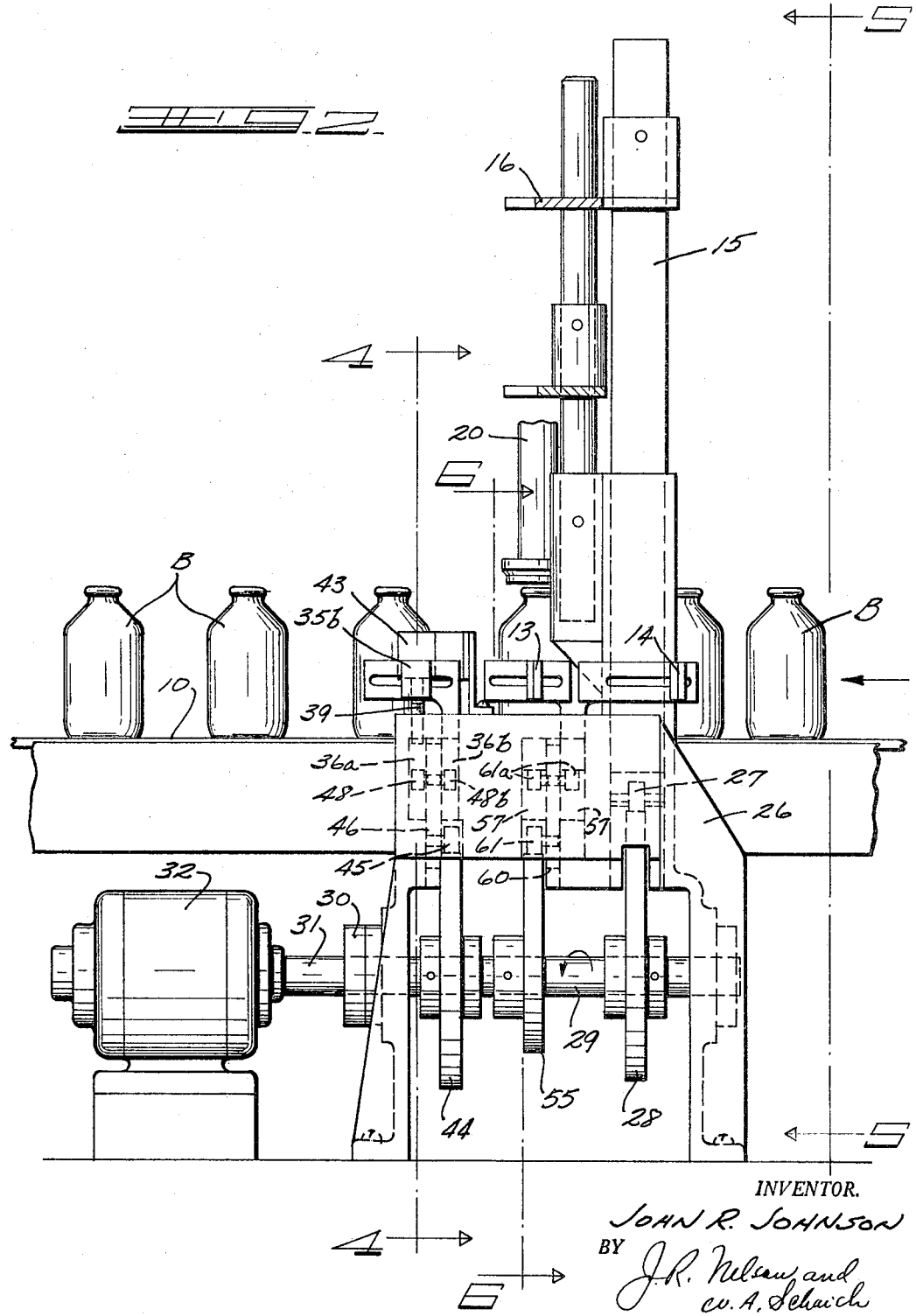

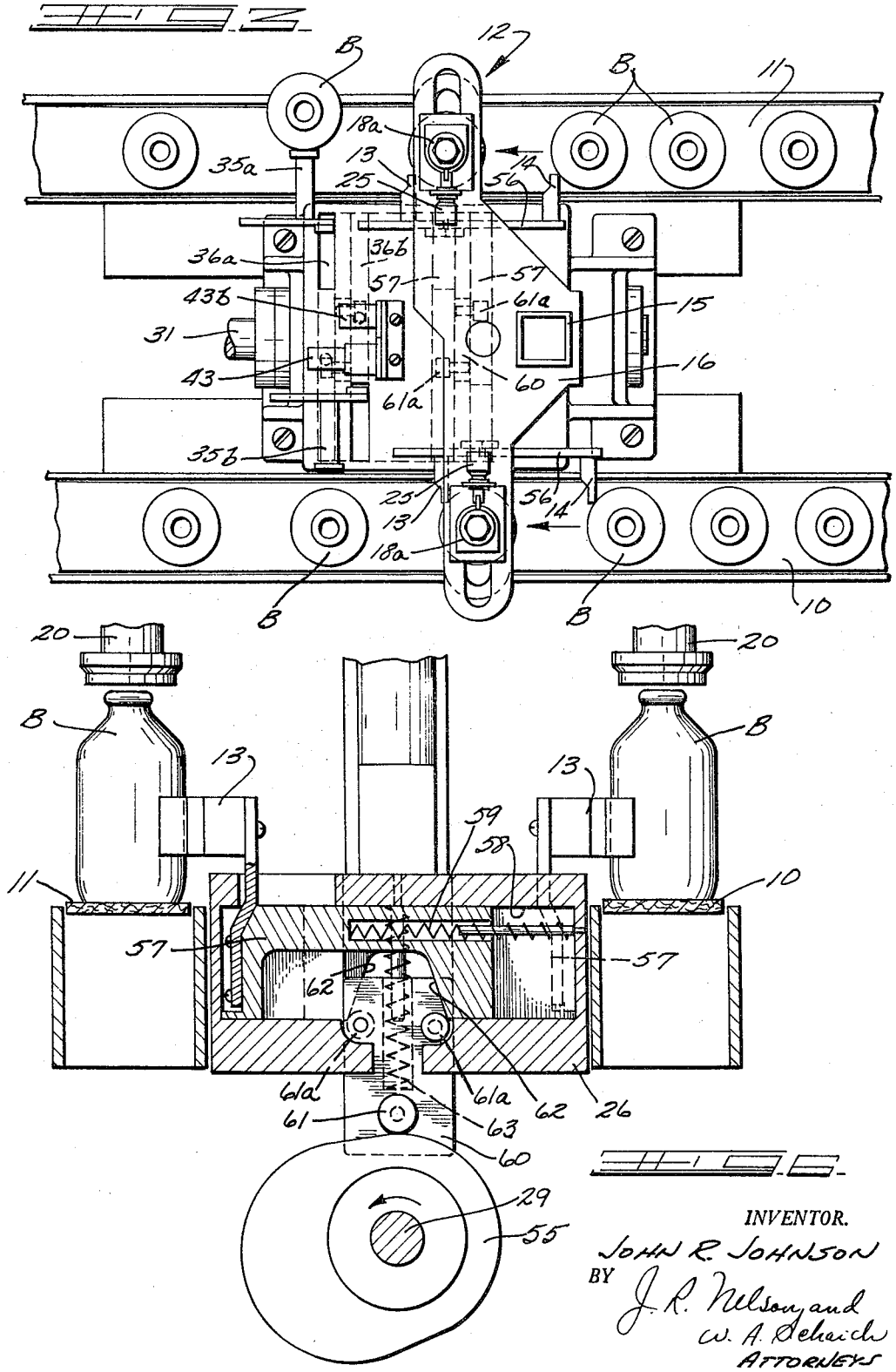

3,268,074
GAUGING APPARATUS
John R. Johnson, Toledo, Ohio, assignor to Owens-Illinois Inc., a corporation of Ohio
Filed Nov. 29, 1963, Ser. No. 326,726
30 Claims. (Cl. 209—74)

This invention relates to gauging apparatus and particularly to gauging apparatus wherein articles are moved successively past an inspection station by a conveyor and are rejected at a point beyond the inspection station in response to a reject signal.

It is an object of this invention to provide a gauging apparatus wherein simple, inexpensive and efficient means is provided for rejecting the article at a position beyond the inspection station.

It is a further object of the invention to provide such an apparatus wherein an electrical reject signal created at the inspection station actuates a mechanical memory device at a reject position beyond the inspection station to reject the article when the article has reached a reject position.

Basically, the apparatus comprises a conveyor that moves the articles successively past an inspection station, gauging means at the inspection station which is adapted to produce an electrical reject signal and reject means at a point beyond the inspection station. The electrical signal produced by the gauging means at the inspection station actuates a mechanical memory device at the reject station which is operated in synchronism with movement of the conveyor to mechanically move the reject means in proper timed relation to reject the article when the article has reached the reject station.

In the drawings:

FIG. 1 is a transverse sectional elevational view of an apparatus embodying the invention.

FIG. 2 is a sectional view taken along the line 2—2 in FIG. 1.

FIG. 3 is a fragmentary plan view.

FIG. 4 is a sectional view taken along the line 4—4 in FIG. 2.

FIG. 5 is a sectional view taken along the line 5—5 in FIG. 2.

FIG. 6 is a sectional view taken along the line 6—6 in FIG. 2.

The apparatus is shown and described in connection with the gauging of hollow glass containers having a neck opening to determine whether or not the neck opening is of proper size, such gauging being conventionally known in the art as plug gauging.

Referring to FIGS. 1, 2 and 5, the apparatus comprises conveyors 10, 11 which are operated continuously at uniform speed to move the bottles B successively to the left (FIGS. 2, 3 and 5) past a plug gauge mechanism at an inspection station 12. At the inspection station, stop bars 13, 14 are moved periodically laterally outwardly into position to stop a container at the plug gauge mechanism and space and stop the following container.

At the inspection station, the gauging mechanism is adapted to be moved downwardly to gauge the openings in the neck of the containers B. Such mechanism comprises a vertically reciprocable post 15 on which a cross plate 16 is mounted. Vertical hollow tubes 17 are supported by plate 16. A rod 18 is positioned in each tube 17 and is provided with a laterally extending collar 18a at its upper end which engages the upper end of tube 17 to limit the downward movement of the rods. Each rod 17 is formed with a plug gauge 19 at its lower end. A short tube 20 is telescoped over the lower end of each tube 17 and has a flange 21 that engages a corresponding flange 22 on tube 17 to limit the downward movement of the short tube 20 relative to the tube 17. The lower end of each short tube 20 is formed with a tapered surface 23 that is adapted to engage the exterior of the neck of the bottle B.

During gauging, the tubes 17 are lowered by plate 16 to bring the surfaces 23 of short tubes 20 into engagement with the necks of the bottles B. Continued downward movement of the plate 16 moves the tubes 17 and, in turn, the rods 18 downwardly to cause the plugs 19 to engage the openings in the necks of the bottles B. If the opening is of proper diameter, the plug 19 continues to move downwardly, as shown on the left in FIG. 5. If, however, the opening is undersized, the plug 19 cannot move downwardly even though the tube 17 continues to move downwardly. This causes the upper end 18a of rod 18 to move upwardly relative to the roller 24 of a switch 25, as shown on the right in FIG. 5, so that an electrical signal is produced. This electrical signal is utilized to condition a mechanical memory device to cause a rejection of the bottle B when it has been moved by the conveyor 11 to a position adjacent a reject mechanism, as presently described.

Referring to FIGS. 2 and 5, the post 15 is slidably mounted for vertical movement in a base 26 and has a roller 27 at the lower end thereof which engages the periphery of a cam 28 fixed on a shaft 29 which is journalled in the base 26. The shaft 29 is connected by a coupling 30 to the shaft 31 of a motor 32. As shown in FIG. 5, the cam 28 has a depressed portion 33 and as the cam rotates, the post 15 is raised and lowered, in turn, raising and lowering the plate 16 and tubes 17 and rods 18 supported by plate 16.

As shown in FIG. 3, the reject mechanism includes reject arms 35a, 35b adjacent each of the conveyors 10, 11 which are adapted to be moved laterally at the proper time to eject a container B. Each of the reject arms 35a, 35b is controlled by a mechanical memory device that is conditioned by the electrical switch 25 which is operated by the plug gauge unit on its respective conveyor.

Referring to FIG. 4, reject arm 35a is mounted on a slide 36a that is movable laterally in a horizontal slideway or opening 37 in the base 26. A compression spring 38, interposed between the slide 36a and the base 26, yieldingly urges the slide and, in turn, the reject member 35a into reject position. A detent plunger 39 extending vertically downwardly through an opening 40 in the base 26 normally engages an opening 41 in the slide 36a to hold and lock the slide 36a out of reject position. The detent 39 is yieldingly urged into holding position by either a spring 42 of a solenoid 43 or by its own weight.

Solenoid 43 is energized by an electrical reject signal from the switch 25 to withdraw the detent 39, permitting the spring 38 to urge the slide 36a toward reject position. However, since the bottle B, which has produced the reject signal, is not in position for rejection, it is desirable to control the movement of the slide 36a so that it will only move into reject position when the conveyor 11 has brought the bottle into proper position adjacent reject member 35a.

In order to achieve this, a cam 44 is fixed on the shaft 29 and the periphery of the cam is engaged by a roller 45 on a vertical slide 46 which is movable upwardly and downwardly in a vertical slideway 47 in the base 26. Vertical slide 46 has a cam follower roller 48 thereon which engages an inclined surface 49 on the horizontal slide 36a. The cam 44 includes a high portion 50 and a depressed portion 51 (FIG. 1) and is driven in synchronism with the conveyor.

A spring yieldingly urges roller 45 on vertical slide 46 against the periphery of cam 44. When the plug rods 17 are in lowered bottle inspecting position, the cam 44 is in position so that the high portion 50 engages and holds the vertical slide 46 in its upper position (FIG. 1) with the roller 48 engaging the surface 49 and holding the slide 36a in retracted position. Thus, even if an electrical reject signal is produced by switch 25 to retract detent 39, the roller 48 engages the surface 49 and prevents the spring 38 from forcing the slide 36a to reject position. However, as the cam 44 continues to rotate and the conveyor 11 carries the bottle out of the inspection station to a reject position adjacent the reject arm 35a, the vertical slide 46 reaches the depressed portion 51 of cam 44 and the roller 48 begins to move downwardly, permitting the slide 36a to move to the left, as shown in FIG. 4. This movement is controlled until the bottle B has reached a position adjacent the reject arm 35a in which position the reject arm 35a finally moves laterally outwardly (FIG. 4) to reject the bottle B. Continued rotation of cam 44 causes vertical slide 46 to move upwardly to retract the horizontal slide 36a and the reject member 35a to a position where the detent 39 enters the opening 41 to lock the horizontal slide 36a and reject member out of reject position.

Reject member 35b is operated and controlled in a manner similar to reject member 35a. As shown in FIGS. 1, 2 and 4, reject member 35b is mounted on a slide 36b movable laterally in a horizontal slideway in the base 26. Slide 36b is yieldingly urged outwardly relative to the conveyor to move the reject arm 35b into reject position by a spring in the same manner as spring 38 urges slide 36a outwardly, the spring having been omitted for purposes of clarity. A detent plunger 39b controlled by a solenoid 43b is yieldingly urged by a spring (not shown) into an opening in the slide 36b to lock the slideway out of reject position. When switch 25, which overlies conveyor 10, is energized, the solenoid 43b is energized to withdraw detent 39b so that the slide 36b is urged outwardly by its spring. The movement of the slide 36b is thereafter controlled in timed relation by a second roller 48b on vertical slide 46 which engages an inclined surface 49b (FIG. 4) on the horizontal slide 36b to control the movement of the horizontal slide 36b and, in turn, the reject member 35b against the action of its spring, and to return them to retracted position, in the same manner as previously described above with reference to slide 36a and reject member 35a.

The movement of the stop bars 13, 14 is in timed relation to the movement of the plug gauges 19 and the reject arms 35a, 35b by an arrangement which includes a cam 55 on the shaft 29. As shown in FIG. 6, the stop bars 13, 14 are mounted on a common bar 56 which is, in turn, supported on slides 57 that are mounted for horizontal movement in an opening 58. Each slide 57 is yieldingly urged outwardly relative to the base 26 by a spring 59. Vertical slide 60 is yieldingly urged downwardly into engagement with the periphery of the cam 55 by a spring 63. Cam 55 is shaped to periodically raise and lower a vertical slide 60 by engagement of a roller 61 on slide 60 with the periphery of the cam 55. Vertical slide 60, in turn, supports rollers 61a which engage inclined surface 62 on the slides 57 to move the slides 57 and, in turn, the stop bars 13, 14 periodically inwardly and outwardly so that the stop bars move into the path of the containers and momentarily interrupt their movements. Stop bar 13 stops a container in proper position below a plug 19 while stop bar 14 spaces the following container so that it will be in substantially correct position for gauging when the conveyors bring it to the inspection station. The spacing between bars 13, 14 is substantially equal to the spacing between the reject members 35a, 35b and the respective plugs 19 at the inspection station.

It can thus be seen that there has been provided an apparatus which is actuated by an electrical reject signal to provide a controlled timed mechanical movement of a reject means to reject the defective article when it reaches the reject station and to return the reject means to its retracted position.

I claim:
1. In a gauging apparatus, the combination comprising conveyor means for moving articles to be inspected into and out of position at an inspection station,
means at said inspection station for inspecting an article and creating an electrical signal in response to a failure of the article to meet a predetermined standard,
reject means positioned at a reject station beyond said inspection station and adapted to move said article off the conveyor means,
means mechanically holding said reject means in retracted position,
said last-mentioned means being responsive to an electrical signal from said gauging means to release said reject means,
and means mechanically operated in synchronism with said conveyor means and said gauging means for moving said reject means into reject position when an article has been moved by the conveyor means into position at said reject station,
said last-mentioned means being operable to return said reject means to its retracted position where it is held by said holding means,
said reject means including a reject member,
and spring means yieldingly urging said reject member toward said reject position.

2. The combination set forth in claim 1 wherein said means for holding said reject member in retracted position comprises
a detent,
said reject member having an opening into which said detent extends.

3. The combination set forth in claim 2 wherein said holding means comprises a solenoid which in one operative position causes said detent to engage said opening and in another operative position in response to said electrical signal causes said detent to move out of engagement with said opening in said reject member.

4. The combination set forth in claim 1 wherein said mechanically operated means comprises
a cam operated in synchronism with said gauging means and said conveyor means,
and a cam follower engaging said cam and said reject member to control the movement of said reject member when said holding means releases said reject member in response to an electrical signal.

5. The combination set forth in claim 1 wherein said articles comprise glass containers and said inspecting means comprises a plug gauge,
and means operated in synchronism with said conveyor for periodically moving said plug gauge downwardly and upwardly toward and away from the opening in the neck of the container at the inspection station.

6. The combination set forth in claim 1 including means operated in synchronism with said mechanically operated means for momentariliy interrupting the movement of a container at said inspection station.

7. The combination set forth in claim 6 wherein said last-mentioned means comprises
a cam operated in synchronism with said gauging means,
a cam follower engaging said cam,
and means operated by said cam follower for moving periodically into and out of the path of said containers on said conveyor means.

8. In a gauging apparatus, the combination comprising a conveyor for moving articles to be inspected successively to an inspection station,
gauging means at said inspection station for successively inspecting said articles,
electrical sensing means for producing an electrical signal when an article fails to meet a predetermined standard, a first slide having reject means thereon, means for mounting said first slide adjacent said conveyor beyond said inspection station for movement of said reject means laterally of the conveyor to move an article off the conveyor, means for urging said first slide yieldingly toward reject position, means for holding said first slide out of reject position and for releasing said slide, a second slide, means for guiding said second slide for movement toward and away from said first slide, a cam rotated in synchronism with said gauging means and said conveyor, a cam follower on said second slide engaging said cam, means responsive to said electrical signal to release said holding means, and means on said second slide engaging said first slide and controlling the movement of said first slide to reject position when it is released by said holding means in such a manner that the reject means moves into reject position when the article which has produced the electrical signal has been moved by the conveyor to a position adjacent the reject means, said engaging and controlling means being operable to return said first slide into position for engagement by said holding means.

9. The combination set forth in claim 8 wherein said means for holding said first slide out of reject position comprises a detent plunger, said first slide having an opening into which said detent plunger extends.

10. The combination set forth in claim 9 wherein said means for releasing said holding means comprises a solenoid operatively connected to said detent plunger.

11. The combination set forth in claim 9 wherein said means on said second slide engaging said first slide comprises a cam follower on said second slide, said first slide having a cam surface which is engaged by said roller.

12. The combination set forth in claim 11 wherein said cam surface on said first slide is inclined outwardly in the direction of movement of the slide to reject position.

13. The combination set forth in claim 8 wherein said means for moving said second slide comprises a circular cam.

14. The combination set forth in claim 8 including a stop member, a third slide, a stop bar on said third slide, means for yieldingly urging said third slide and said stop bar into position for interrupting the movement of a container on said conveyor, a fourth slide, means for guiding said fourth slide for movement toward and away from said third slide, a cam rotated in synchronism with said gauging means and said conveyor, and means on said fourth slide engaging said third slide and controlling the movement of said third slide and in turn said stop member into and out of the path of said containers.

15. In a gauging apparatus, the combination comprising a conveyor for moving articles to be inspected successively through an inspection station, gauging means at said inspection station for successively inspecting said article, electrical sensing means for producing an electrical signal when the article fails to meet a predetermined standard, a horizontal slide having reject means thereon, means for mounting said horizontal slide adjacent said conveyor for horizontal movement of said reject means laterally of the conveyor to move an article off the conveyor, spring means for urging said horizontal slide yieldingly toward reject position, said horizontal slide having an opening therein into which said plunger extends to hold said horizontal slide out of reject position, a vertical slide, means for guiding said vertical slide for movement upwardly and downwardly, a cam rotated in synchronism with said gauging means and said conveyor, means responsive to said electrical signal to release said plunger, said horizontal slide having a surface inclined upwardly and outwardly, and means on said vertical slide engaging the inclined surface of said horizontal slide and controlling the movement of said horizontal slide to reject position when it is released by retraction of said plunger in such a manner that the reject means moves into reject position when the article which has produced the electrical signal has been moved by the conveyor to a position adjacent the reject means.

16. In a gauging apparatus, the combination comprising a pair of conveyors for moving articles to be inspected successively through inspection stations, gauging means at each inspection station adjacent each conveyor for successively inspecting said articles, electrical sensing means individual to each said gauging means for producing an electrical signal when the article fails to meet a predetermined standard, a pair of horizontal slides, reject means on each said slide, means for mounting each said slide adjacent its respective conveyor for horizontal movement of said reject means laterally of its respective conveyor to move an article off the conveyor, means for urging said horizontal slide yieldingly toward reject position, means for holding each said horizontal slide out of reject position, a vertical slide, means for guiding said vertical slide for movement upwardly and downwardly, a cam rotated in synchronism with said gauging means and said conveyors, means responsive to said electrical signal to release said holding means, each said horizontal slide having a surface inclined upwardly and outwardly, and means on said vertical slide engaging the inclined surfaces of said horizontal slides and controlling the movement of each said horizontal slide to reject position when it is released by said holding means in such a manner that the reject means moves into reject position when the article which has produced the signal has been moved by the conveyor to a position adjacent the reject means.

17. In a gauging apparatus, the combination comprising a conveyor for moving glass containers to be inspected successively to an inspection station, gauging means at said inspection station for successively inspecting said glass containers comprising a plug gauge movable in synchronism with said conveyor toward and away from the opening in the neck of the container, electrical sensing means for producing an electrical signal when a glass container fails to meet a predetermined standard, a first slide having reject means thereon, means for mounting said first slide adjacent said conveyor beyond said inspection station for movement of said reject means laterally of the conveyor to move a glass container off the conveyor, means for urging said first slide yieldingly toward reject position, a second slide, means for guiding said second slide for movement toward and away from said first slide, a cam rotated in synchronism with said gauging means and said conveyor, a cam follower on said second slide engaging said cam, means responsive to said electrical signal to release said holding means, and means on said second slide engaging said first slide and controlling the movement of said first slide to reject position when it is released by said holding means in such a manner that the reject means moves into reject position when the glass container which has produced the electrical signal has been moved by the conveyor to a position adjacent the reject means, said engaging and controlling means being operable to return said horizontal slide into position for engagement by said holding means.

18. For use in a gauging apparatus wherein a conveyor moves articles to be inspected into and out of gauging position at an inspection station and means at said inspection station inspects the article and creates an electrical signal in response to a failure of the article to meet a predetermined standard, the combination comprising reject means adapted to be positioned at a point beyond said inspection station and adapted to move said article off the conveyor means, means mechanically holding said reject means in retracted position, said last-mentioned means being responsive to an electrical signal from said gauging means to release said reject means, and means mechanically adapted to be operated in synchronism with said conveyor and said gauging means for moving said reject means into reject position when the article has been moved by the conveyor means into position beyond said inspection station, said last-mentioned means being operable to return said reject means to its retracted position where it is held by said holding means, said reject means including a reject member, and spring means yieldingly urging said reject member toward said reject position.

19. The combination set forth in claim 18 wherein said means for holding said reject member in retracted position comprises a detent, said reject member having an opening into which said detent extends.

20. The combination set forth in claim 19 wherein said holding means comprises a solenoid which in one operative position causes said detent to engage said opening and in another operative position in response to said electrical signal causes said detent to move out of engagement with said opening in said reject member.

21. The combination set forth in claim 18 wherein said mechanically operated means comprises a cam operated in synchronism with said gauging means and said conveyor means, and a cam follower engaging said cam and said reject member to control the movement of said reject member when said holding means releases said reject member in response to an electrical signal.

22. For use in a gauging apparatus wherein a conveyor moves articles to be inspected successively into and out of an inspection station and gauging means at said inspection station inspect the article and create an electrical signal when the article fails to meet a predetermined standard, the combination comprising a first slide having reject means thereon, means for mounting said first slide adjacent said conveyor for movement of said reject means laterally of the conveyor to move an article off the conveyor, means for urging said first slide yieldingly toward reject position, means for holding said first slide out of reject position and for releasing said slide, a second slide, means for guiding said second slide for movement toward and away from said first slide, a cam adapted to be rotated in synchronism with said gauging means and said conveyor, means responsive to said electrical signal to release said holding means, and means on said second slide engaging said first slide and controlling the movement of said first slide to reject position when it is released by said holding means in such a manner that the reject means moves into reject position when the article which has produced the electrical signal has been moved by the conveyor to a position adjacent the reject means and said engaging and controlling means returns said first slide into position for engagement by said holding means.

23. The combination set forth in claim 22 wherein said means for holding said first slide out of reject position comprises a detent plunger, said first slide having an opening into which said detent plunger extends, and a solenoid operatively connected to said plunger and adapted to be energized by said electrical reject signal.

24. The combination set forth in claim 23 wherein said means on said vertical slide comprises a cam follower on said vertical slide and a cam surface on said horizontal slide.

25. In a gauging apparatus, the combination comprising conveyor means for moving articles to be inspected into and out of position at an inspection station, means at said inspection station for inpsecting an article and creating an electrical signal in response to a failure of the article to meet a predetermined standard, reject means positioned at a reject station beyond said inspection station and adapted to move said article off the conveyor means, said reject means being responsive to an electrical signal to move said article off the conveyor means, and mechanical memory means cyclically operable continuously in synchronism with said conveyor means and said gauging means to permit movement of said reject means to move an article off the conveyor means only at timed intervals with respect to the movement of said conveyor means, said last-mentioned means being operable to prevent movement of said reject means when said reject means recieves said electrical signal except at said predetermined timed intervals.

26. In a gauging apparatus, the combination comprising conveyor means for moving articles to be inspected into and out of position at an inspection station, means at said inspection station for inspecting an article and creating an electrical signal in response to a failure of the article to meet a predetermined standard, reject means positioned at a reject station beyond said inspection station and adapted to move said article off the conveyor means, means mechanically holding said reject means in retracted position, said last-mentioned means being responsive to an electrical signal from said gauging means to release said reject means, and mechanical memory means operated in synchronism with said conveyor means and said gauging means for holding said reject means against movement into reject position except at predetermined timed intervals corresponding to the movement of the article which has been inspected into position at said reject station.

27. The combination set forth in claim 26 wherein said last-mentioned means comprises cam means operated in synchronism with said conveyor means and said gauging means and a cam follower engaging said cam means and said reject means to control the movement of said reject member and permit the movement of said reject member into reject position only in response to an electrical signal and only at predetermined intervals.

28. For use in a gauging apparatus wherein a conveyor moves articles to be inspected into and out of gauging position at an inspection station and means at said inspection station inspects the article and creates an electrical signal in response to a failure of the article to meet a predetermined standard, the combination comprising reject means adapted to be positioned at a reject signal station beyond said inspection station and adapted to move said article off the conveyor means, said reject means being responsive to an electrical signal to move said article off the conveyor means, and mechanical memory means cyclically operable continuously in synchronism with said conveyor means and said gauging means to permit movement of said reject means to move an article off the conveyor means only at timed intervals with respect to the movement of said conveyor means, said last-mentioned means being operable to prevent movement of said reject means when said reject means receives said electrical signal except at said predetermined timed intervals.

29. For use in gauging apparatus wherein a conveyor moves articles to be inspected into and out of gauging position at an inspection station and means at said inspection station inspects the article and creates an electrical signal in response to a failure of the article to meet a predetermined standard, the combination comprising reject means adapted to be positioned at a reject signal station beyond said inspection station and adapted to move said article off the conveyor means, means mechanically holding said reject means in retracted position, said last-mentioned means being responsive to an electrical signal from said gauging means to release said reject means, and mechanical memory means operated in synchronism with said conveyor means and said gauging means for holding said reject means against movement into reject position except at predetermined timed intervals corresponding to the movement of the article which has been inspected into position at said reject station.

30. The combination set forth in claim 29 wherein said last-mentioned means comprises cam means operated in synchronism with said conveyor means and said gauging means and a cam follower engaging said cam means and said reject means to control the movement of said reject member and permit the movement of said reject member into reject position only in response to an electrical signal and only at predetermined intervals.

References Cited by the Examiner

UNITED STATES PATENTS

| | | | |
|---|---|---|---|
| 1,411,169 | 3/1922 | Ehrman | 209—72 |
| 2,115,032 | 4/1938 | Miller. | |
| 2,759,600 | 8/1956 | Saylor | 209—74 X |
| 2,987,179 | 6/1961 | Allgeyer | 209—74 X |
| 3,100,570 | 8/1963 | White | 209—82 |
| 3,207,307 | 9/1965 | Means | 209—74 |

M. HENSON WOOD, JR., *Primary Examiner.*

J. N. ERLICH, *Assistant Examiner.*